United States Patent

Hattori et al.

[11] Patent Number: 4,601,369
[45] Date of Patent: Jul. 22, 1986

[54] VEHICLE ELECTRONIC CONTROL METHOD

[75] Inventors: Toshihiro Hattori, Ayase; Masaki Ishihara, Fujisawa, both of Japan

[73] Assignee: Isuzu Motors Limited, Tokyo, Japan

[21] Appl. No.: 566,324

[22] Filed: Dec. 28, 1983

[30] Foreign Application Priority Data

Dec. 28, 1982 [JP] Japan ............................. 57-230310

[51] Int. Cl.$^4$ ............................................. B60K 41/22
[52] U.S. Cl. .................................. 192/3.58; 192/3.62; 74/865; 74/473 R
[58] Field of Search ............... 192/0.052, 0.073, 0.092, 192/3.58, 3.61, 3.62; 74/473 R, 865, 866; 364/424.1

[56] References Cited

U.S. PATENT DOCUMENTS

| | | | |
|---|---|---|---|
| 3,756,358 | 9/1973 | Espenschied et al. | 192/0.09 |
| 4,181,036 | 1/1980 | Janke | 74/473 X |
| 4,324,322 | 4/1982 | Sibeud | 192/0.032 |
| 4,463,622 | 8/1984 | Freiburger | 74/337.5 |

FOREIGN PATENT DOCUMENTS 1179838 2/1970 United Kingdom .
1225448 3/1971 United Kingdom .

Primary Examiner—George H. Krizmanich
Assistant Examiner—James J. Merek
Attorney, Agent, or Firm—Staas & Halsey

[57] ABSTRACT

A method of electronically controlling a vehicle according to which, when a transmission is shifted into the reverse gear position, a clutch is disengaged followed by switching the transmission to a neutral position. With the clutch in the disengaged state, the transmission is then temporarily switched to a gear position having a synchromesh mechanism, whereby a disk clutch pressing against a pressure plate or flywheel is separated from the same. After the clutch is completely disengaged, the transmission is switched to the reverse gear position.

4 Claims, 6 Drawing Figures

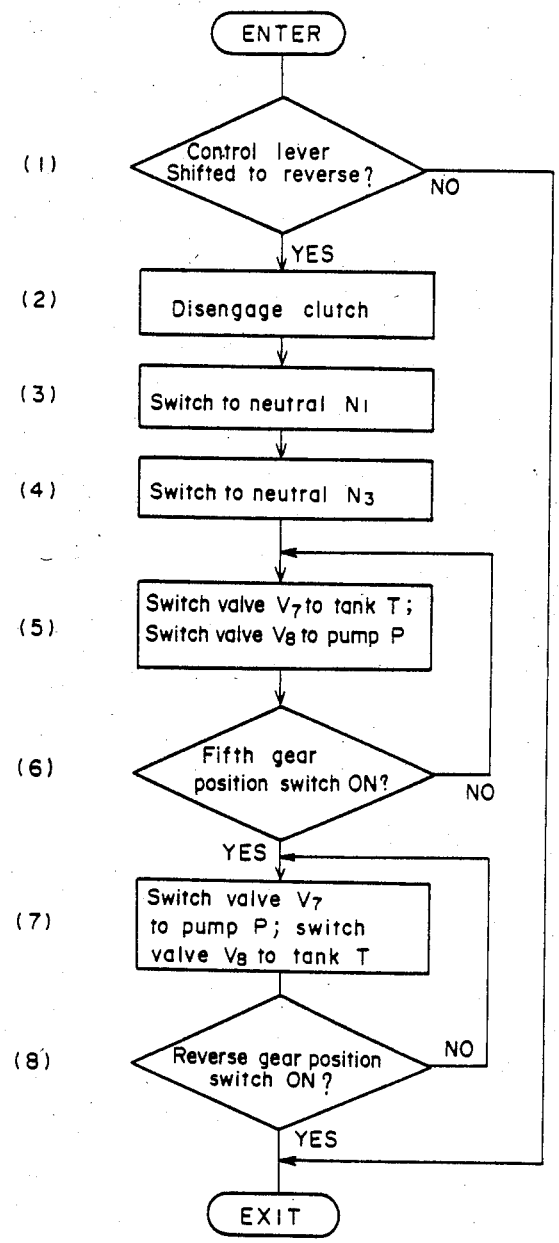

VEHICLE ELECTRONIC CONTROL METHOD

BACKGROUND OF THE INVENTION

The present invention relates to a method of electronically controlling a vehicle.

Vehicles, typically automobiles, powered by internal combustion engines have a transmission coupled between the engine and driven wheels for effective utilization of output power from the engine. In operation, one of different gear ratios of the transmission is selected to meet the particular vehicle speed. For example, when the vehicle is to run at a low speed, a larger gear ratio of the transmission is used.

In a recently developed transmission system, use is made of a hydraulic drive mechanism controlled by a computerized electronic control unit to automatically drive an internal lever which controls a disk clutch and selects transmission gears. The system has a select actuator for operating the clutch actuator of the hydraulic drive in such a manner that the disk clutch is operated as if by a human foot, and for driving the interval lever selectively in a Y direction, as well as a shift actuator for driving the internal lever in an X direction perpendicular to the Y direction. The computerized electronic control unit has a memory for storing data known as a shift map representing transmission stages corresponding to automobile speeds and degrees of depression of an accelerator pedal. While the automobile is being driven, the electronic control unit detects the vehicle speed and depression of the accelerator pedal at all times and searches the shift map based on these data to determine an optimum transmission gear. Then, the electronic control unit issues a command to operate the shift actuator and select actuator alternatingly to thereby select an optimum transmission gear ratio.

Let us investigate an automobile equipped with the electronic control unit in a situation where the automobile is at rest following the completion of forward motion. The engine will be idling, the transmission will be in neutral, and the disk clutch will be in the disengaged state. However, when the transmission is in neutral, the transmission counter shaft is capable of rotating freely so that there are cases where the disk clutch, though disengaged, is still pressed against a pressure plate or flywheel. In consequence, the transmission counter shaft is rotated by the engine. In addition, even if the clutch is completely disengaged immediately after the forwardly traveling automobile is stopped, the counter shaft continues rotating for a time because of inertia. To drive the automobile in reverse starting from the condition of the automobile just described, the driver switches the shift lever to the reverse position, whereupon the electronic control unit issues a command to operate the shift actuator and select actuator alternatingly in an effort to mesh the main shaft gear of the transmission with the reverse idle gear. In this operation, the stationary main shaft gear is made to mesh with the reverse idle gear, which is rotating together with the counter shaft, and the disk clutch is made to separate from the pressure plate or flywheel. As a result, the main shaft gear is subjected to an excessive load and, during the shifting operation, not only produces annoying noise but sustains considerable wear. Though this problem can be solved by providing the reverse position gear mechanism with a synchromesh mechanism, redesigning and manufacturing the gear mechanism anew would entail an increase in cost. Another disadvantage is that it would be unable to utilize the conventionally employed transmission.

SUMMARY OF THE INVENTION

An object of the present invention is to provide a vehicle electronic control method which enables smooth gear shifting to the reverse position without the provision of a synchromesh mechanism for this purpose.

The present invention pertains to a vehicle having a clutch controlled by a clutch actuator, a transmission for changing gear ratios by a transmission actuator and having a synchromesh mechanism provided at a gear position other than a reverse gear position, and an electronic control unit for controlling both actuators in accordance with the vehicle running conditions. According to the present invention, the vehicle is controlled electronically through steps including:

(a) disengaging the clutch in response to a command delivered to the clutch actuator by the electronic control unit at the same time that the transmission starts to be switched to the reverse gear position;

(b) switching the transmission to a neutral gear position in response to a command delivered to the transmission actuator by the electronic control unit after the clutch is disengaged;

(c) switching the transmission to a gear position provided with the sychromesh mechanism in response to a command delivered to the transmission actuator by the electronic control unit with the clutch remaining in the disengaged state; and (d) switching the transmission to the reverse gear position in response to a command delivered to the transmission actuator by the electronic control unit with the clutch remaining in the disengaged state.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a flowchart showing progressive steps of a gear shifting operation.

DESCRIPTION OF THE PREFERRED EMBODIMENTS

Figure 1:
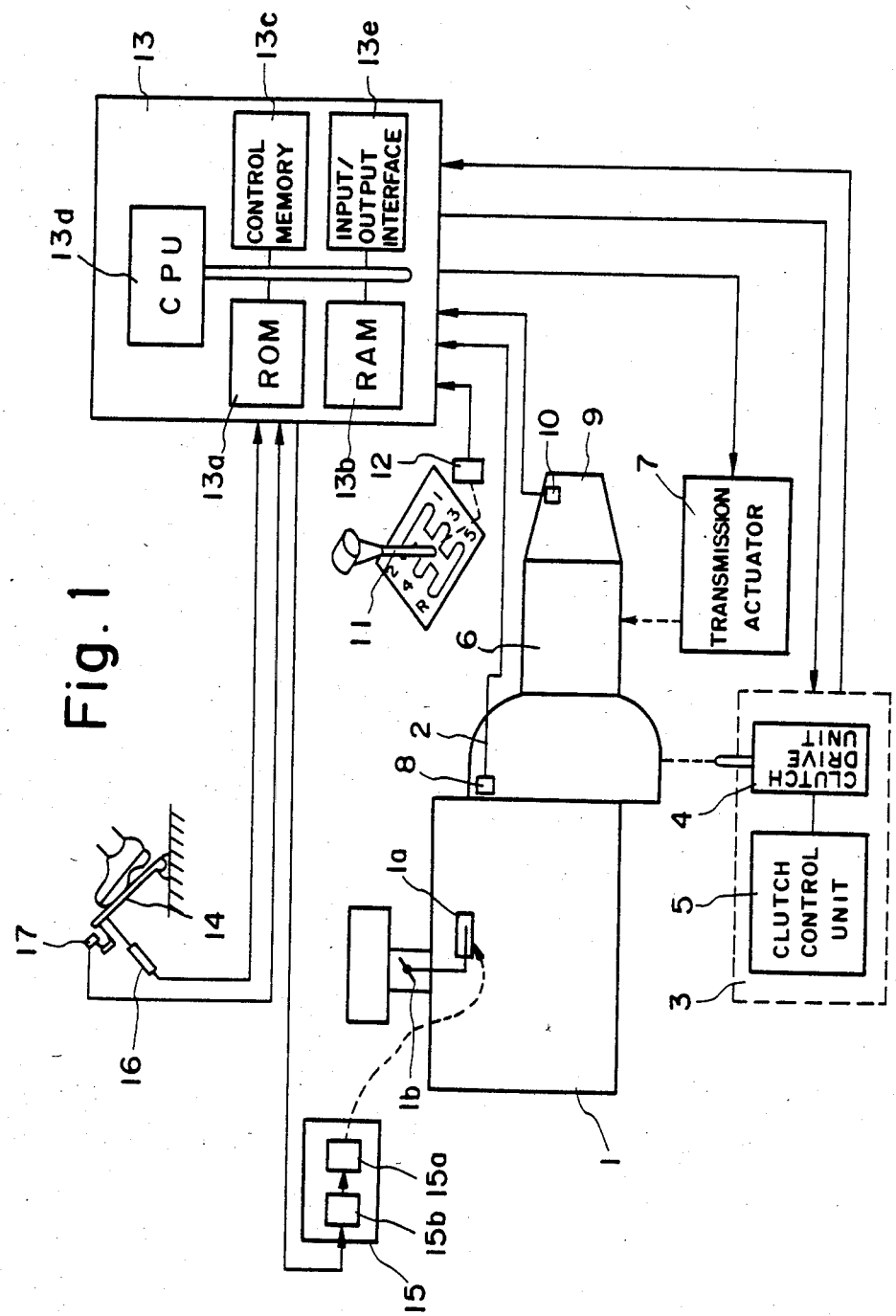
FIG. 1 is a block diagram schematically showing an engine, a transmission, a clutch, and an electronic control unit in a vehicle used in conjunction with the control method of the invention.

FIG. 1 schematically shows in block diagram an engine, a transmission, a clutch, and an electronic control unit therefor. A gasoline engine 1 has a throttle actuator 1a operatively coupled to a throttle valve 1b for actuating the same. A clutch 2 is operatively connected to the engine and actuatable by a clutch actuator 3 composed of a clutch drive unit 4 and a clutch control unit 5. A parallel-shaft gear transmission 6 is operatively connected to the clutch 2 and actuatable by a transmission actuator 7 for changing gear ratios. The rotation of the engine 1 is detected by an engine rotation sensor 8. A wheel driving mechanism 9 is operatively coupled with the transmission 6 and includes a propeller shaft, a universal joint, and other components (not shown). A vehicle speed sensor 10 is disposed in the wheel driving mechanism 9. A drive control lever 11 serves to actuate a position switch 12 which issues a signal to an electronic control unit 13. In response to the signal from the position switch 12, the electronic control unit 13 delivers a signal dependent on the position of the control lever 11 to the transmission actuator 7 for selecting a gear ratio of the transmission 6 in accordance with the applied signal. More specifically, when the control lever 11 is in a range or position 1, the transmission 6 is controlled to select the 1st gear; when the control lever 11 is in a range 2, the transmission 6 is controlled to be automatically shifted between the 1st and 2nd gears; when the control lever 11 is in a range 3, the transmission 6 is controlled to be automatically shifted among 1st, 2nd and 3rd gears; when the control lever 11 is in a range 4, the transmission 6 is controlled to be automatically shifted among 1st, 2nd, 3rd and 4th gears; when the control lever 11 is in a range 5, the transmission 6 is controlled to be automatically shifted among 1st, 2nd, 3rd, 4th and 5th gears; when the control lever 11 is in a range R, the transmission 6 is controlled to select the reverse gear; and when the control lever 11 is in a range N, the transmission 6 is controlled to select neutral. The vehicle also has an accelerator pedal 14, a throttle control unit 15, a potentiometer 16 for detecting the degree of depression of the accelerator pedal 14, and an idling switch 17. The throttle control unit 15 includes a driver 15a for actuating the throttle valve 1b and a controller 15b for controlling the driver 15a. The throttle control unit 15 is responsive to a signal from the potentiometer 16 for controlling the opening of the throttle valve 1b dependent on the depression of the accelerator pedal 14.

The electronic control unit 13 comprises a read-only memory 13a storing a sequence program for controlling operation of the engine 1, data for controlling gear changes in the transmission 6, data for controlling actuation of the clutch 2, and other necessary data a random-access data memory 13b for storing the results of arithmetic operations, input data and other data, a control memory 13c for storing a control program a central processor 13d for executing arithmetic operations and for processing data under the control of the control program and the sequence program and an input/output interface 13e. According to the present invention, the electronic control unit 13 controls engine control parameters such as the rate of supply of fuel to the gasoline engine 1 and ignition timing to meet engie operating conditions, and, in addition, controls the clutch 2 and the gear changes in the transmission 6. For the clutch and transmission control, the read-only memory 13a stores data for connecting and disconnecting the clutch 2 and data for controlling the gear changes in the transmission 6.

The electronic control unit 13 receives outputs from the potentiometer 16, the position switch 12, and the vehicle speed sensor 10 successively through the input/output interface 13e, these signals entering the data memory 13b. The central processor 13d computes and determines an optimum gear stage in response to the depression of the accelerator pedal 14, the indication by the control lever 11 and the speed of the automobile, which are indicated by the received input data. The gear change and clutch control output data which correspond to the determined gear stage are then read out of the read-only memory 13a and issued through the input/output interface 13e to the transmission actuator 7 and the clutch actuator 3. The transmission actuator 7 and the clutch actuator 3 are then driven in response to the supplied data to operate the transmission 6 and the clutch 2 for effecting a desired gear change. The electronic control unit 13 carries out such data reception, gear stage determination, and issuance of control data at all times so that the transmission 6 will operate at an optimum gear stage at all times.

Figure 2:
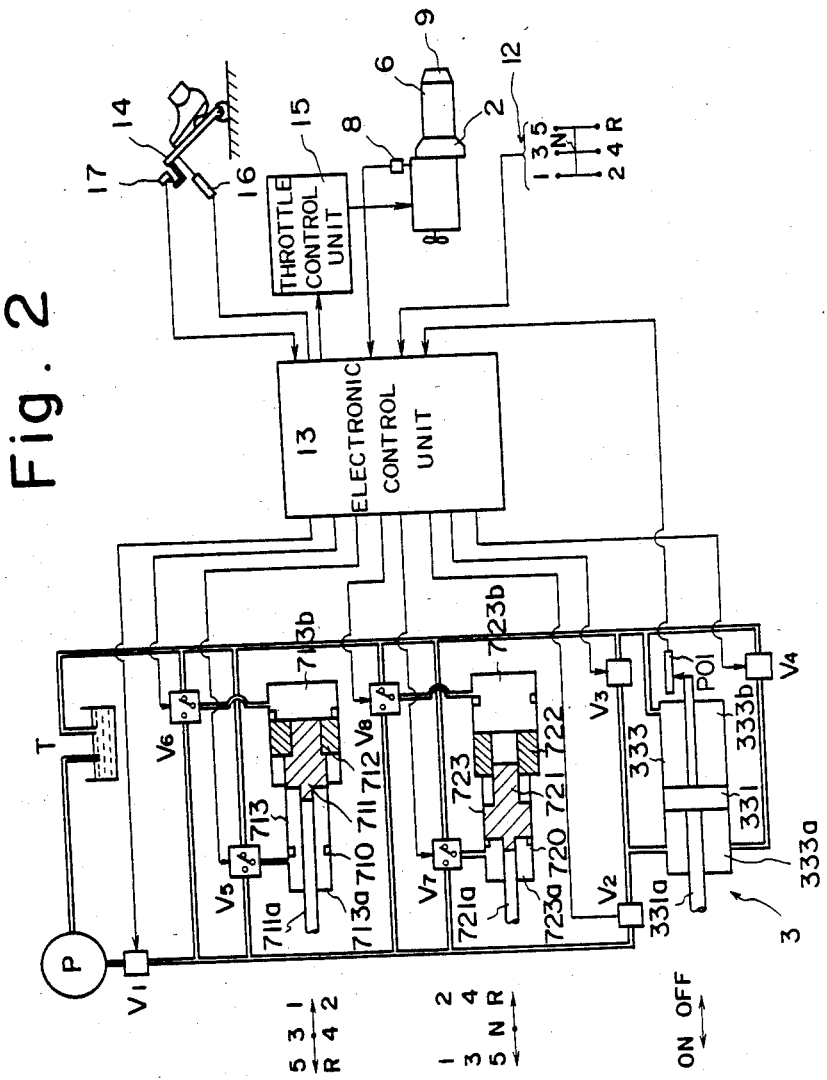
FIG. 2 is a a circuit diagram of a hydraulic circuit arrangement of a transmission actuator and a clutch actuator used in conjunction with the control method of the invention.

FIG. 2 shows a hydraulic circuit arrangement of the transmission actuator 7 and the clutch actuator 3 used in conjunction with the electronic control method of this invention. The circuit arrangement includes a select actuator 710, a shift actuator 720, switching valves V1 through V4, directional control valves V5 through V8, a pump P, and a tank T. The 1st through 5th gear positions are designated by 1 through 5, the neutral position by N, and the reverse gear position by R. The clutch engaging and disengaging positions are indicated by ON and OFF, respectively. FIG. 3(B) illustrates the gear positions in greater detail, there being three neutral positions N1, N2 and N3.

The select and shift actuators 710, 720 can provide three stop positions, and comprise stepped cylinders 713, 723, respectively, first pistons 711, 721, respectively, disposed slidably therein, and tubular second pistons 712, 722 fitted over the first pistons 711, 721, respectively, and disposed slidably in the cylinders 713, 723, respectively. The first pistons 711, 721 have piston rods 711a, 721a held in engagement with an internal lever (not shown) of the transmission 6. The select and shift actuators 710, 720 are in the neutral positions when a fluid pressure acts in each of chambers 713a, 713b and 723a, 723b in the stepped cylinders 713, 723 of the actuators 710, 720. When the chambers 713a, 723a are pressurized, the first pistons 711, 721 together with the second pistons 712, 722 are moved to the right (FIG. 2). When the fluid pressure acts in the chambers 713b, 723b, only the first pistons 711, 721 are moved leftward (FIG. 2).

The chambers 713a, 713b in the select actuator 710 are held in fluid communication through the directional control valves V5, V6, respectively, with the pump P (also through the switching valve V1) and the tank T.

The chambers 723a, 723b in the shift actuator 720 are held in fluid communication through the directional control valves V7, V8, respectively, with the pump P (also through the switching valve V1) and the tank T.

The clutch actuator 3 comprises a cylinder 333, a piston 331 disposed slidably therein, and a piston rod 331a having one end connected to the piston 331 and an opposite end connected to an actuator lever (not shown) of the clutch 2. The cylinder 333 has a chamber 333a communicating with the pump P through the switching valves V1, V2 and with the tank T through the switching valve V3 and the switching valve V4 which is controlled to be opened and closed cyclically. The cylinder 333 also has a chamber 333b kept in fluid communication with the tank T at all times.

The piston 331, the piston rod 331a, and the cylinder 333 jointly constitute the clutch drive unit 4, and a positional control potentiometer P01 and the switching valves V2, V3, V4 jointly constitute the clutch control unit 5.

Figure 3A:
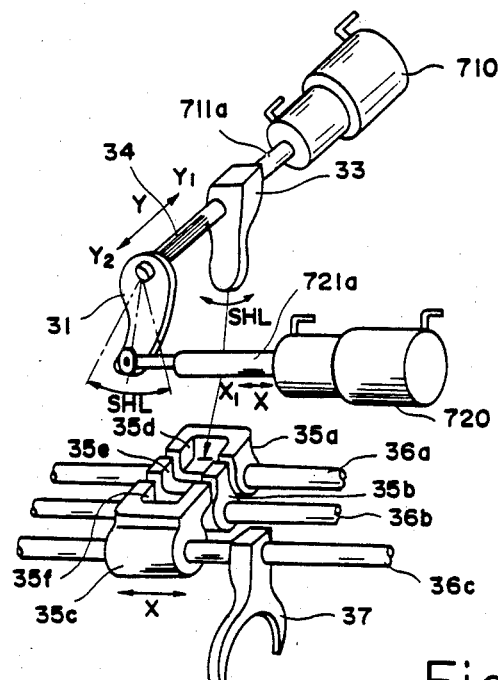
FIG. 3(A) is an exploded perspective view illustrative of a portion of the internal construction of the transmission according to a first embodiment used in conjunction with the control method of the invention.
Figure 3B:
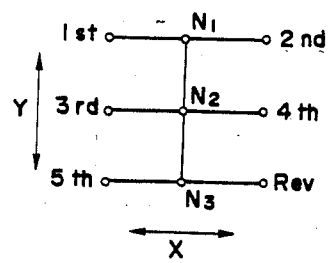
FIG. 3(B) is a top view showing a pattern of movement of an internal lever used in conjunction with the control method of the invention.

As illustrated in FIG. 3(A), the select actuator 710 and the shift actuator 720 are arranged in mutually perpendicular Y and X directions, respectively. The select actuator 710 includes a rod 711a to which there is secured an internal lever 33 movable in the Y direction on movement of the rod 711a in the Y direction. A shift lever 31 is splined at 34 to the rod 711a at an end thereof for co-rotation therewith, and is movable in the Y direction along the rod 711a. The rod 711a can be turned about its own axis in response to angular movement of the shift lever 31. The shift lever 31 is pivotably joined to the end of the rod 721a of the shift actuator 720, which is movable in an X direction perpendicular to the Y direction. Accordingly, when the shift actuator 720 is actuated to move the rod 721a axially, the shift lever 31 is angularly moved to turn the rod 711a of the select actuator 710 about its own axis. The internal lever 33 can therefore be moved in the Y direction by the rod 711a, and turned in an SHL direction by the shift lever 31. The internal lever 33 has a distal end for engaging, one at a time, slots 35d, 35e, 35f in shift blocks 35a 35b, 35c fixed respectively to shift rods 36a, 36b, 36c. In response to axial movement of the rod 711a of the select actuator 710, the end of the internal lever 33 can traverse the slots 35d-35f and is positioned in a desired one of the slots 35d-35f. The angular movement of the shift lever 31 causes one of the shift blocks which is engaged by the internal lever 33 to move in the X direction. A shift fork 37 (only one shown) is mounted on each of the shift rods 36a, 36b, 36c for moving a clutch sleeve (not shown). The movement of a desired one of the shift blocks forces the corresponding shift rod and hence the shift fork to move until the clutch sleeve is actuated, whereupon desired gears are brought into meshing engagement, and the previously meshing gears are disengaged from each other, thereby effecting a gear change. More specifically, the internal lever 33 is movable to three positions in the Y direction by axial movement of the rod 711a of the select actuator 710, and also to three positions in the X direction by angular movement of the shift lever 31 caused by axial movement of the rod 721a of the shift actuator 720. Thus, the internal lever 33 can assume a total of nine positions. One of the shift blocks 35a, 35b, 35c is selected when the internal lever 33 is placed in a corresponding one of the three positions in the Y direction, i.e., select direction. The selected shift block is moved in the X direction or shift direction when the internal lever 33 is angularly moved to one of the positions in the X direction. The above nine positions correspond to the 1st, 2nd, 3rd, 4th, 5th positions, the reverse position Rev, and the neutral positions N1, N2, N3, as shown in FIG. 3(B), of a manual change lever. Therefore, the select direction is defined as the direction in which the internal lever 33 can be moved between the neutral positions N1, N2, N3, and the shift direction is defined as the direction in which the internal lever 33 is movable from the 1st, 2nd, 3rd, 4th, 5th positions and the reverse position Rev to the neutral positions N1, N2, N3, or vice versa. The internal lever 33 is movable along the path defined by two partially overlapping "H"s connecting the nine positions in response to the movement of the shift lever 31 in the X direction and the movement of the rod 711a in the Y direction, and can be stably retained in one of the nine positions at a time. For example, when the 1st gear position is to be selected while the internal lever 33 is in the neutral position N2, the rod 711a of the select actuator 710 is actuated to move the internal lever 33 in the direction of the arrow Yl, as illustrated in FIG. 3(A), and the shift lever 31 is turned clockwise about the rod 711a to turn the internal lever 33 clockwise to move the shift block 35a in the direction of the arrow X1, thereby selecting the 1st gear position.

Figure 4:
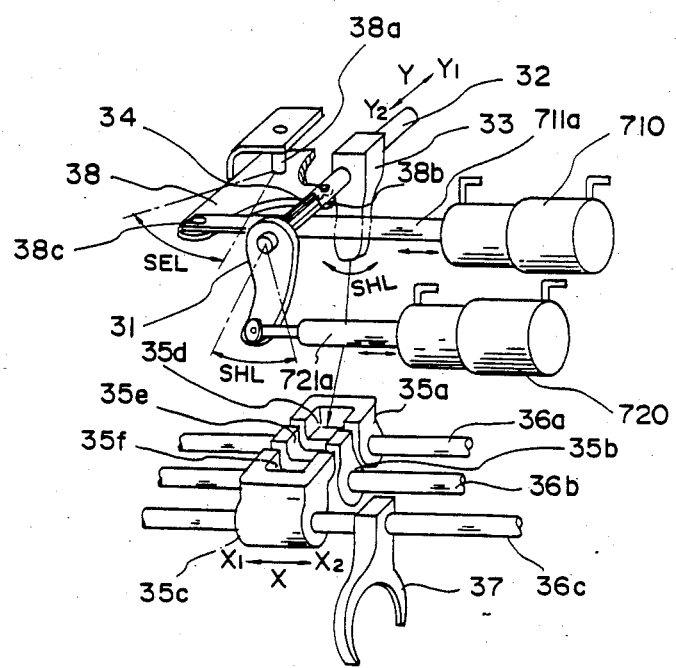
FIG. 4 is an exploded perspective view of a portion of the internal construction of a transmission according to another embodiment used in conjunction with the control method of the invention.

Although in FIG. 3(A) the rods 711a, 721a of the corresponding select actuator 710 and the shift actuator 720 are arranged perpendicularly to each other, they may be positioned parallel to each other as shown in the embodiment of FIG. 4. More specifically, the rod 711a is separated from a shaft 32 supporting the internal lever 33, and the select and shift actuators 710, 720 are arranged parallel to each other. The shaft 32 and the rod 711a are operatively interconnected by a lever 38 mounted on a vertical shaft 38a for angular movement thereabout. The lever 38 has ends 38b, 38c pivotably coupled to the shaft 32 and the rod 711a. With the select and shift actuators 710, 720 thus arranged parallel to each other, they can be alternately actuated to effect gear selection in the manner described above.

The transmission 6 is equipped with a gear mechanism exactly the same as that of the well-known manual transmission. This is provided with a well-known synchromesh mechanism for performing a synchromesh operation when selecting the 1st, 2nd, 3rd, 4th and 5th gear positions for forward motion.

Reference will now be had to the flowchart of FIG. 5 to describe the operation of the illustrated embodiment for a case where the transmission is shifted from the 1st gear position for forward motion to the reverse position Rev. Initially, the internal lever 33 of the transmission 6 is in the 1st gear position. In this 1st gear position and with reference to FIG. 2, the switching valve V1 is closed, the switching valves V2, V3, V4 are open, the directional control valves V5, V6, V7, V8 are in communication to the tank T which is open to the atmosphere, and no hydraulic pressure acts on the select actuator 710 and the shift actuator 720. The vehicle is moving forward slowly with the accelerator pedal 14 depressed slightly. To stop and then back up the vehicle, the driver removes his foot from the accelerator pedal and shifts the control lever 11 from the 1st gear drive position to the reverse position R (step 1 in the FIG. 5 flowchart). This is detected by the electronic control unit 13 which issues a signal to move to execution of the program for controlling the reversal of the vehicle. With the execution of the program, the electronic control unit 13 produces a clutch disengage signal. In response to this signal, the switching valves V3, V4 are closed, and simultaneously the directional control valves V5, V8 are switched to the pump P. The above valve operation is in preparation for applying the fluid pressure to the chamber 713a in the select actuator 710 and the chamber 723b in the shift actuator 720 when the switching valve V1 is opened, thereby setting the select and shift actuators 710, 720 into the positions shown in FIG. 2. Next, the switching valves V1, V2 are opened to pressurize the chamber 333a for moving the piston 331 in the clutch actuator 3 to the right (FIG. 2), thus disengaging the clutch 2 (step 2 in FIG. 5). Since the select and shift actuators 710, 720 are fixed in the positions shown in FIG. 2 by the foregoing operation, they will not be moved in error even though they are acted upon by the fluid pressure from the chamber 333b in the clutch actuator 330. When the clutch 2 is disengaged, the switching valve 2 is closed, and the directional control valves V5, V8 are switched to the tank T.

Next, the directional control valve V5 is switched to the pump P, and the directional control valves V7, V8 are also switched to the pump P. This valve operation fixes the select actuator 710 in the neutral position N1 and causes the shift actuator 720 to shift the internal lever 33 from the 1st gear position to the neutral position N1 until the step of the first piston 721 abuts against the second piston 722 to stop the rod 721a in the central position (step 3 in FIG. 5).

When the transmission gears are returned to the neutral position N1, the directional control valves V5, V7, V8 are switched to the tank T.

Thereafter, the directional control valves V7, V8 are switched to the pump P to secure the shift actuator 720 in the neutral position N1, and at the same time the directional control valve V6 is switched to the pump P to pressurize the chamber 713b to force the second piston 712 against the step of the stepped cylinder 713 and the first piston 711 to the lefthand end shown in FIG. 2. This position is the neutral position N3 which allows shifting to the 5th gear position or the reverse position Rev (step 4 in FIG. 5). The fluid discharged from the chamber 713a in the select actuator 710 at this time cannot operate the shift actuator 720 in error as the latter is in the fixed position.

Upon completion of the above step, the directional control valves V5, V7, V8 are switched again to the tank T.

The directional control valve V7 is then switched to the tank T, and the directional control valve V6 is switched to the pump P. The directional control valve V8 is also switched to the pump P (step 5 in FIG. 5). In response to this valve operation, the select actuator 710 is fixed and the shift actuator 720 is actuated to move the internal lever 33 from the neutral postion N3 to the 5th gear position (step 6 in FIG. 5). When this gear change is taking place, the synchromesh operates between the main shaft of the transmission 6 and the main drive, so that a force acts upon the idling counter shaft in an effort to stop the counter shaft. As a consequence, the disk clutch pressed against the pressure plate or flywheel is separated from the same, and the counter shaft stops rotating.

Next, the directional control valves V6, V7 are switched to the pump P, and the direction control valve V8 is switched to the tank T (step 7 in FIG. 5). As a result of these operations, the select actuator 710 is fixed and the first and second pistons 721, 722 of the shift actuator 720 are moved to the right side in FIG. 2, so that the rod 721a is moved from the 5th gear position to the reverse gear position Rev (step 8 in FIG. 5). As mentioned above, the rotation of the counter shaft of the transmission 6 has already been stopped, so that the reverse idle gear also is at rest at this time. Therefore, the main shaft gear can be readily meshed with the reverse idle gear.

When these operations end, the direction control valves V6, V7 are again switched to the tank T, thereby finishing the gear shifting operation from the 1st gear position to the reverse position Rev.

With the transmission gears in the reverse position Rev, the accelerator pedal 14 is depressed to enable the electronic control unit 13 to issue a command to the clutch control unit 5 for opening and closing the switching valves V3, V4 cyclically to release the fluid pressure in the chamber 333a in the clutch actuator 3 gradually. When this is done, the clutch 2 is forced under its own spring resiliency to move the piston rod 331a slowly to the left (FIG. 2) until the clutch 2 is returned to the engaging or connected position. The vehicle now starts moving slowly backward. When the clutch 2 is fully engaged, the vehicle backs at a speed dependent on the degree of depression of the accelerator pedal 14. The switching valve V1 is closed (the switching valve V2 remains closed), and the directional control valves V5, V6, V7, V8 are switched to the tank T while the switching valves V3, V4 remain open, thus releasing the hydraulic pressure.

In the illustrated embodiment, after the execution of step 4 in the flowchart of FIG. 5, the transmission 6 is temporarily switched to the 5th gear position and then to the reverse position Rev. Since this operation comprises movement on one and the same select line, operation solely of the select actuator suffices and the time is used most efficiently. However, the present invention is not limited to this operation for it is permissible to switch to a stage provided with another synchromesh mechanism.

Though the transmission in the illustrated embodiment has a synchromesh mechanism provided for all of the gear mechanisms from the 1st through 5th gear positions, it goes without saying that the electronic control method of the invention is not limited in application to this arrangement but can be applied to transmissions in which only some of the gear positions are equipped with a synchromesh mechanism.

Although certain preferred embodiments have been shown and described, it should be understood that many changes and modifications may be made therein without departing from the scope of the appended claims.

What is claimed is:

1. A method of electronically controlling a vehicle having a clutch controlled by a clutch actuator, a transmission for changing gear ratios by a transmission actuator and having a synchromesh mechanism provided at gear positions other than a reverse gear position, and an electronic control unit for controlling both actuators in accordance with the vehicle running conditions, said method comprising steps of:
   (a) disengaging the clutch in response to a command delivered to the clutch actuator by the electronic control unit at the same time that the transmission starts to be switched to the reverse gear position;
   (b) switching the transmission to a neutral gear position in response to a command delivered to the transmission actuator by the electronic control unit after the clutch is disengaged;
   (c) switching the transmission to a gear position provided with the synchromesh mechanism in response to a command delivered to the transmission actuator by the electronic control unit with the clutch remaining in the disengaged state; and
   (d) switching the transmission to the reverse gear position in response to a command delivered to the transmission actuator by the electronic control unit with the clutch remaining in the disengaged state.

2. The method according to claim 1, wherein the transmission is a parallel-shaft gear transmission.

3. The method according to claim 1, wherein the clutch is a disk clutch.

4. The method according to claim 1, wherein step (c) comprises switching the transmission to a gear position provided with the synchromesh mechanism and facing the reverse gear position with the neutral gear position serving as the center therebetween.

* * * * *